United States Patent
Yaman et al.

(10) Patent No.: US 8,787,709 B2
(45) Date of Patent: Jul. 22, 2014

(54) POLARIZATION-ALTERNATING OPTICAL SIGNAL GENERATION USING CSRZ MODULATION

(75) Inventors: Fatih Yaman, Monmouth Junction, NJ (US); Shaoliang Zhang, Plainsboro, NJ (US); Lei Xu, Princeton Junction, NJ (US); Ting Wang, West Windsor, NJ (US); Yoshihisa Inada, Tokyo (JP); Takaaki Ogata, Tokyo (JP); Yasuhiro Aoki, Tokyo (JP)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 13/435,775

(22) Filed: Mar. 30, 2012

(65) Prior Publication Data

US 2012/0251028 A1    Oct. 4, 2012

Related U.S. Application Data

(60) Provisional application No. 61/470,095, filed on Mar. 31, 2011.

(51) Int. Cl.
*G02F 1/035* (2006.01)
*G02F 1/01* (2006.01)

(52) U.S. Cl.
CPC .................................. *G02F 1/01* (2013.01)
USPC ............................. 385/3; 359/246; 359/264

(58) Field of Classification Search
None
See application file for complete search history.

(56) References Cited

U.S. PATENT DOCUMENTS

2003/0039461 A1 *  2/2003  How Kee Chun et al. .... 385/140

* cited by examiner

*Primary Examiner* — Jerry Rahll
(74) *Attorney, Agent, or Firm* — Joseph Kolodka

(57) ABSTRACT

A method for optical chirp-free optical polarization modulation includes dividing a data modulated optical signal into a first optical path and a second optical path, using a Mach-Zehnder intensity modulator in the first optical path for imparting a π phase difference between adjacent symbols of the data modulated optical signal in the first optical path, adjusting a delay and amplitude of symbols of the data modulated optical signal in the second path so that the symbols in the first path and the symbols in the second path are synchronized and have substantially equal power levels, and combining the first and second optical paths so that symbols from the first and second optical paths are in orthogonal polarizations.

12 Claims, 2 Drawing Sheets

POLARIZATION-ALTERNATING OPTICAL SIGNAL GENERATION USING CSRZ MODULATION

RELATED APPLICATION INFORMATION

This application claims priority to provisional application Ser. No. 61/470,095 filed on Mar. 31, 2011, the contents thereof are incorporated herein by reference.

BACKGROUND

The present invention relates to optical communications, and, more particularly, to polarization-alternating optical signal generation using carrier-suppressed-return-to-zero CSRZ modulation.

Optical fiber communication distance is limited by signal impairments caused by fiber nonlinearity. One of the important research targets is to mitigate the nonlinear impairment. One method to mitigate nonlinear impairments is to use polarization switching, which sometimes is also called as alternate polarization keying. In this method, polarization of the adjacent symbols is alternated between two orthogonal polarizations. Because adjacent symbols have orthogonal polarization, the nonlinear crosstalk between adjacent symbols is reduced, and therefore nonlinear impairments are reduced. It is of great value to design a method for polarization switching which can achieve the desired nonlinear mitigation, without causing additional impairment or sacrificing the system performance.

The solutions offered so far by others heretofore can be divided into two categories: in the first category, the signal is divided into two arms with equal power. On one arm, the adjacent symbols of the optical signal are modulated with alternating 0 and π phase shifts. Before recombining the two arms together, the state of polarizations of the two arms are made orthogonal to each other. When the two arms are recombined, one symbol has two orthogonal polarization components with the same phase while the next symbol has polarization components with opposite phase. Therefore, adjacent symbols are set into orthogonal polarizations. In some cases imparting opposite phases to adjacent symbols is achieved by using phase modulators. In other cases, the opposite phase is imparted in electro-optic devices by making use of the fact that these devices can have polarization dependent index modulation.

In the second category, an optical switch is used to separate adjacent symbols into different paths. Polarizations of the separated symbols are adjusted to be orthogonal before they are recombined.

Accordingly, there is a need for polarization-alternating optical signal generation using CSRZ modulation that improves upon the prior art.

SUMMARY

A method for optical chirp-free optical polarization modulation includes dividing a data modulated optical signal into a first optical path and a second optical path, using a Mach-Zehnder intensity modulator in the first optical path for imparting a π phase difference between adjacent symbols of the data modulated optical signal in the first optical path, adjusting a delay and amplitude of symbols of the data modulated optical signal in the second path so that the symbols in the first path and the symbols in the second path are synchronized and have substantially equal power levels, and combining the first and second optical paths so that symbols from the first and second optical paths are in orthogonal polarizations.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
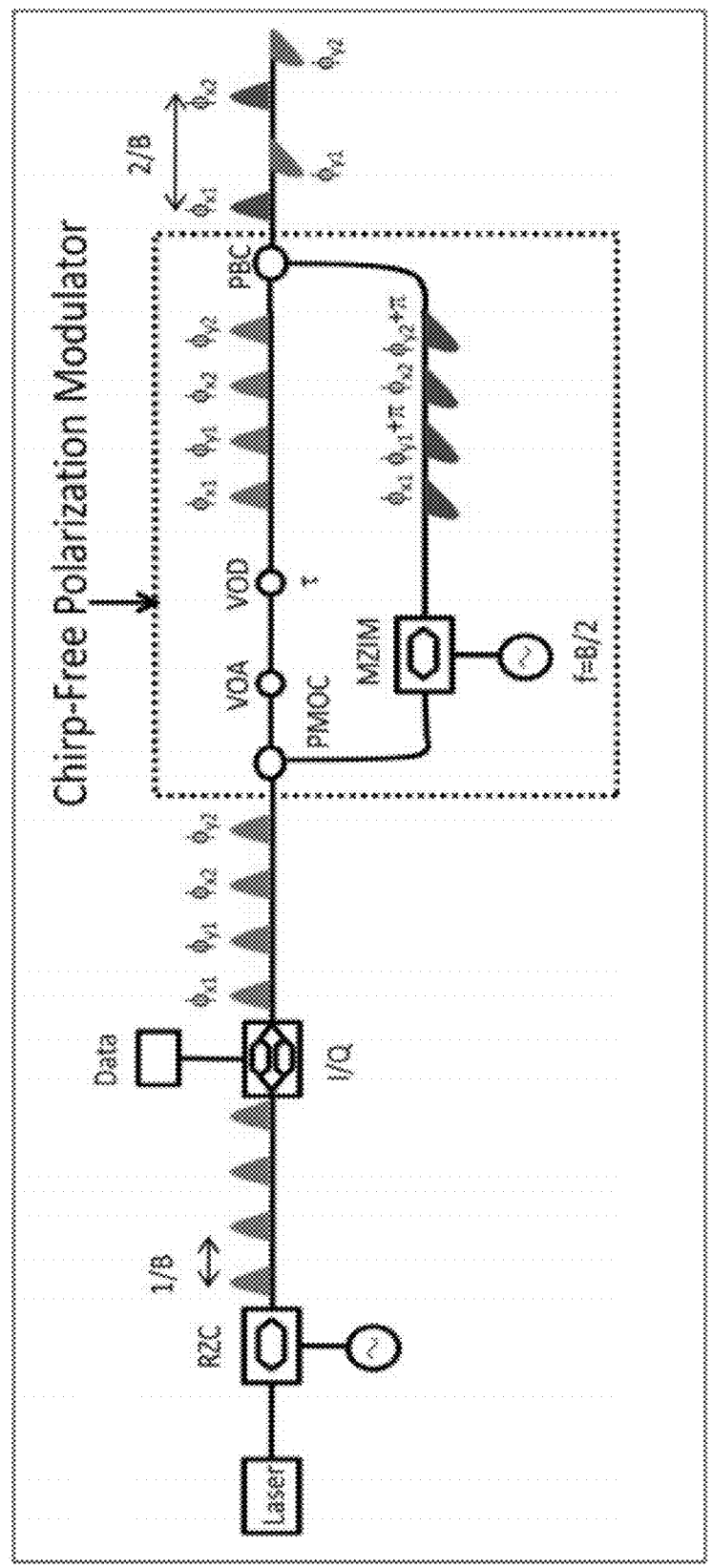
FIG. 1 is a diagram of an exemplary optical circuit employing a chirp free high bandwidth polarization modulator, in accordance with the invention.

The present invention is directed to a better way to implement polarization switching compared to existing methods. Some of the desirable features of the inventive polarization switching include (1) while the state of polarization is alternated between adjacent symbols, the state of the polarization remain constant inside the symbol duration; (2) polarization modulation does not alter and in particular does not broaden the signal optical spectrum; and (3) the polarization switching is achieved at high speeds to accommodate polarization switching at current symbol rates which can be as high as 40 Gb/s; (4) the signal is switched completely between two orthogonal polarizations.

The inventive polarization-alternating optical signal generation using carrier-suppressed-return-to-zero CSRZ modulation provides a practical solution, and can produce signals with better quality, at similar or lower cost. When compared to other solutions described in the first category in hereinabove, the inventive method has the advantage of not inducing any phase chirp on the signal. In inventive solution the intensity modulator adds a constant phase to the entire symbol, and for the next symbol, a phase shifted by is added. The phase jumps from 0 to π instantly where the optical power drops to zero. Therefore, the polarization switched signal does not suffer from unwanted chirp. In addition, because the phase remains constant through the duration of the symbol and jumps instantly between the signal, the state of polarization also remains constant through the duration of the symbol and jumps to the orthogonal polarization between the symbols.

When phase modulators are used as in the prior art discussed hereinabove, the phase evolves slowly from one symbol to the other. Therefore the symbol acquires a time dependent phase or chirp Introducing additional chirp has the disadvantage of increasing the optical spectrum. This reduces the dispersion and polarization mode dispersion tolerance of the generated optical signal. In some systems there is simply not enough bandwidth to allocate this increased bandwidth. The increased optical spectrum can also cause inter channel cross talk as some of the spectrum overlaps with the neighboring channel. In practical system implementations, it may be difficult to generate precise π phase shift with a phase modulator due to the slight variation of the device $V\pi$ and modulator driving voltage.

Other solutions offered in the second category, discussed hereinabove, use electro optical devices in the push-pull configuration so that they do not induce chirp like phase modulators. However, these modulators still do not produce constant polarization across the symbol. This is particularly critical in phase-shift keyed modulation systems that use differential detection at the receiver such as differential phase shift keying or differential quadrature phase shift keying. Differential detection receivers rely on delayed interferometers which beat symbols with adjacent symbols with the same state of polarization. For maximum eye opening, the beating symbols have to have the same state of polarization since orthogonal polarizations do not interfere. If the state of polarization is not constant across the symbol period, any mismatch between the delay of the interferometer and the symbol period will result in reduced eye opening. On the other hand, when intensity modulators are used for polarization switching, the state of the polarization remains constant across the symbol and in this case, system has a higher tolerance to deviations in the interferometer delay. Indeed, in some cases it is beneficial to use demodulators with intentionally larger or smaller delay than symbol period. Note that the intensity modulator also acts as a pulse carver with a 67% duty cycle. If the polarization switched signals do not have return to zero modulation or they have a more than 50% duty cycle, the intensity modulator is expected to broaden the optical spectrum but not more than the spectral width of 50% duty cycle return to zero modulation format.

The advantage of using intensity modulators for polarization modulation over using optical switches as described in the second category, discussed hereinabove, is that optical switches typically have smaller bandwidth than intensity modulators and also that they tend to have worse extinction ratio. When optical switches are used the extinction ratio is typically around 23 dB. When intensity modulators are used, the extinction ratio is determined by polarization optics components rather than the intensity modulator which typically can have extinction ratio beyond 30 dB with relatively low cost. Commercially available optical switches that operate at high bit rates (e.g. >20 Gb/s) are expensive and require high swing voltages to produce the switching. 40 Gb/s intensity modulators with low $V\pi$ are more available and inexpensive.

Referring now to FIG. 1, there is shown an exemplary optical circuit with the chirp-free high bandwidth polarization modulator. The symbols and abbreviations have the following meanings: Laser denotes a collimated optical light source or equivalent thereof, MZIM denotes a Mach-Zehnder intensity modulator, RZC denotes a return-to-zero pulse carver, B denotes a symbol rate per polarization, PMOC denotes a Polarization maintaining optical coupler, VOD denotes a variable optical delay, VOA denotes a variable optical attenuator and PBC denotes a polarization beam combiner Referring now again to FIG. 1, after a return to zero carving (RZC) and data modulation, the signal is divided into two paths in the inventive chirp-free polarization modulator. In one arm an intensity modulator MZIM driven by a sinusoidal signal at half the symbol rate f=B/2 imparts a $\pi$ phase difference between adjacent symbols. In the upper arm a variable optical delay VOD and a variable optical attenuator VOA are used to adjust the delay and the amplitude of the symbols so that symbols at the upper arm and lower arm are synchronized and have the same power level.

The two arms are combined using a polarization beam combiner PBC so that symbols from the upper arm and from the lower arm are in orthogonal polarizations. As an example, if the upper arm is in x polarization and the lower arm is in the y polarization, when the two arms are combined, the symbols that had 0 phase shift will have a linear polarization with 45 degree angle, and the symbols that experienced $\pi$ phase shift in the lower arm will have a linear polarization with −45 degree angle. Therefore the adjacent symbols will alternate in polarization between the two orthogonal linear polarizations.

Since the two arms have to be physically separate, it is possible that an additional phase delay may occur between the two arms. Such phase variations can occur due to temperature fluctuations or mechanical vibrations which are very slow with at most microsecond time scale compared to 10 s of picoseconds of symbol duration. In this case the adjacent symbols will remain orthogonal to one another, however, the overall polarization angle may change slowly at the speed of the random phase.

The inventive chirp-free polarization modulator does not require a pulse carver, even though a pulse carver is shown in FIG. 1. The data modulation can be implemented before the polarization switching module as shown in the figure, or it can be implemented after polarization switching, or it can be implemented separately at each arm at half the symbol rate before the two arms are recombined.

Figure 2:
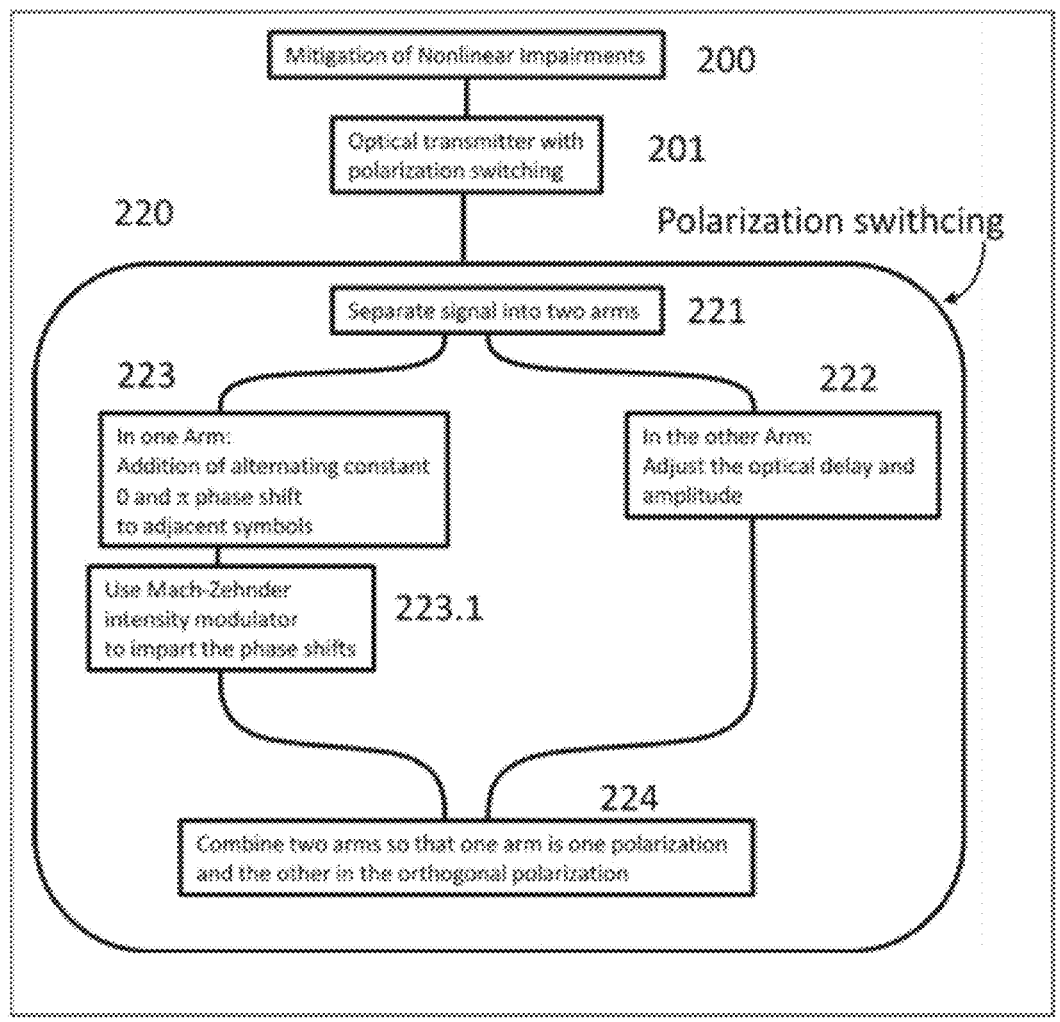
FIG. 2 is a flow diagram of the polarization modulator of FIG. 1, in accordance with the invention.

Referring now to FIG. 2, there is shown a diagram of key aspects of the present inventive chirp-free polarization modulation. The inventive chirp-free polarization modulation attempts to solve the problem of impairments caused by fiber nonlinearity during transmission (200). One solution is mitigation of nonlinear impairments by using optical transmitters that produce polarization switched signals (201). One way of producing optical switching is in the transmitter the signal is separated into two arms (221). In one arm adjacent symbols experience a phase difference of a periodically (223). The phase difference is produced by Mach-Zehnder intensity modulator (223.1). In the other arm, the signal delay and amplitude is adjusted by variable optical delay, and a variable optical attenuator (222). The two arms are combined so that signal from one aim is placed in one polarization and the signal from the polarization is placed in the orthogonal polarization (224). This can be achieved easily with a polarization beam splitter as long as the two arms use polarization maintaining components.

The key aspect of the present inventive chirp-free polarization modulation is the use of Mach-Zehnder intensity modulator in the lower atm of the polarization modulator marked as RZC2, instead of a phase modulator to impart alternating phases. In the prior art, either the polarization switched signal experiences unwanted chirp, or the state of polarization does not remain constant in the duration of the symbols, or the bandwidth of the polarization modulator is not large enough, or the extinction ratio achieved by the polarization modulator is not large enough. When the inventive Mach-Zehnder intensity modulator technique is used, the state of polarization does not change in the duration of the symbol, and no unwanted phase chirp is added. High bandwidth (40 Gb/s) intensity modulators are available at low cost. Extinction ratios above 30 dB can be achieved with low cost polarization components such as polarization maintaining optical coupler, polarization beam combiner and polarization maintaining fibers.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for optical chirp-free optical polarization modulation, comprising the steps of:
   dividing a data modulated optical signal into a first optical path and a second optical path;
   using a Mach-Zehnder intensity modulator in said first optical path for imparting a π phase difference between adjacent symbols of said data modulated optical signal in said first optical path;
   adjusting a delay and amplitude of symbols of said data modulated optical signal in said second path so that said symbols in said first path and said symbols in said second path are synchronized and have substantially equal power levels; and
   combining said first and second optical paths so that symbols from said first and second optical paths are in orthogonal polarizations.

2. The method of claim 1, wherein said Mach-Zehnder intensity modulator is driven by a sinusoidal signal at half a symbol rate.

3. The method of claim 1, wherein if the second optical path is in x polarization and said first optical path is in the y polarization, when the two optical paths are combined, the symbols that had 0 phase shift will have a linear polarization with 45 degree angle, and the symbols that experienced π phase shift in the second optical path m will have a linear polarization with −45 degree angle, thereby adjacent symbols will be alternating in polarization between the two orthogonal linear polarizations.

4. The method of claim 1, wherein for said first and second optical paths being physically separate additional random phase variations occurring due to temperature fluctuations or mechanical vibrations which are very slow with at most microsecond time scale compared to 10 s of picoseconds of symbol duration, in which case said adjacent symbols will remain orthogonal to one another and an overall polarization angle may change slowly at speed of said random phase.

5. The method of claim 1, wherein said first and second optical paths divide a non-modulated optical signal and an output from said combining of said first and second optical paths is data modulated.

6. The method of claim 1, wherein said first and second optical paths divide a non-data modulated optical signal and data modulation is imparted separately in each of said first and second optical paths at half a symbol rate before said first and second optical paths are recombined.

7. A method for optical chirp-free optical polarization modulation, comprising the steps of:
   dividing a data modulated optical signal into a first optical path and a second optical path;
   using a Mach-Zehnder intensity modulator in said first optical path for imparting a π phase difference between adjacent data symbols of said data modulated optical signal in said first optical path;
   adjusting a delay and amplitude of symbols of said data modulated optical signal in said second path so that said data symbols in said first path and said symbols in said second path are synchronized and have substantially equal power levels; and
   combining said first and second optical paths so that data symbols from said first and second optical paths are in orthogonal polarizations.

8. The method of claim 7, wherein said Mach-Zehnder intensity modulator is driven by a sinusoidal signal at half a symbol rate.

9. The method of claim 7, wherein if the second optical path is in x polarization and said first optical path is in they polarization, when the two optical paths are combined, the symbols that had 0 phase shift will have a linear polarization with 45 degree angle, and the data symbols that experienced π phase shift in the second optical path m will have a linear polarization with −45 degree angle, thereby adjacent data symbols will be alternating in polarization between the two orthogonal linear polarizations.

10. The method of claim 7, wherein for said first and second optical paths being physically separate additional random phase variations occurring due to temperature fluctuations or mechanical vibrations which are very slow with at most microsecond time scale compared to 10 s of picoseconds of symbol duration, in which case the adjacent data symbols will remain orthogonal to one another and an overall polarization angle may change slowly at speed of said random phase.

11. The method of claim 7, wherein said first and second optical paths divide a non-modulated optical signal and an output from said combining of said first and second optical paths is data modulated.

12. The method of claim 7, wherein said first and second optical paths divide a non-data modulated optical signal and data modulation is imparted separately in each of said first and second optical paths at half a symbol rate before said first and second optical paths are recombined.

* * * * *